United States Patent [19]

Mueller et al.

[11] Patent Number: 5,379,324
[45] Date of Patent: Jan. 3, 1995

[54] SYSTEM AND METHOD FOR CALCULATING CHANNEL GAIN AND NOISE VARIANCE OF A COMMUNICATION CHANNEL

[75] Inventors: Bruce D. Mueller, Palatine; Kevin L. Baum, Hoffman Estates; David E. Borth, Palatine; Phillip D. Rasky, Buffalo Grove; Eric H. Winter, Oakpark, all of Ill.

[73] Assignee: Motorola, Inc., Schaumburg, Ill.

[21] Appl. No.: 8,249

[22] Filed: Jan. 25, 1993

Related U.S. Application Data

[62] Division of Ser. No. 724,663, Jul. 2, 1991, Pat. No. 5,214,675.

[51] Int. Cl.$^6$ ............................................. H04L 27/06
[52] U.S. Cl. ........................................ 375/94; 375/84; 375/100; 371/43
[58] Field of Search ................ 375/94, 100, 101, 102, 375/84, 27, 34, 26; 371/41, 43; 455/132

[56] References Cited

U.S. PATENT DOCUMENTS

| | | | |
|---|---|---|---|
| 5,065,411 | 11/1991 | Muto | 375/14 |
| 5,091,918 | 2/1992 | Wales | 375/99 |
| 5,134,635 | 7/1992 | Hong et al. | 375/94 |
| 5,142,551 | 4/1992 | Borth et al. | 375/94 |
| 5,202,903 | 4/1993 | Okanoue | 375/100 |
| 5,233,630 | 8/1993 | Wolf | 375/67 |

Primary Examiner—Stephen Chin
Assistant Examiner—T. Ghebretinsae
Attorney, Agent, or Firm—Daniel W. Juffernbruch; Rolland R. Hackbart

[57] ABSTRACT

A system and method for correcting for Rayleigh interference of a signal transmitted upon a multi-path channel. The system adaptively calculates values of channel gain and noise variance of the channel upon which the signal is transmitted, and generates signals indicative of such calculations which are supplied to a decoder. The system may be utilized to form a portion of a coherent, or noncoherent receiver which receives encoded and differentially-encoded signals.

4 Claims, 9 Drawing Sheets

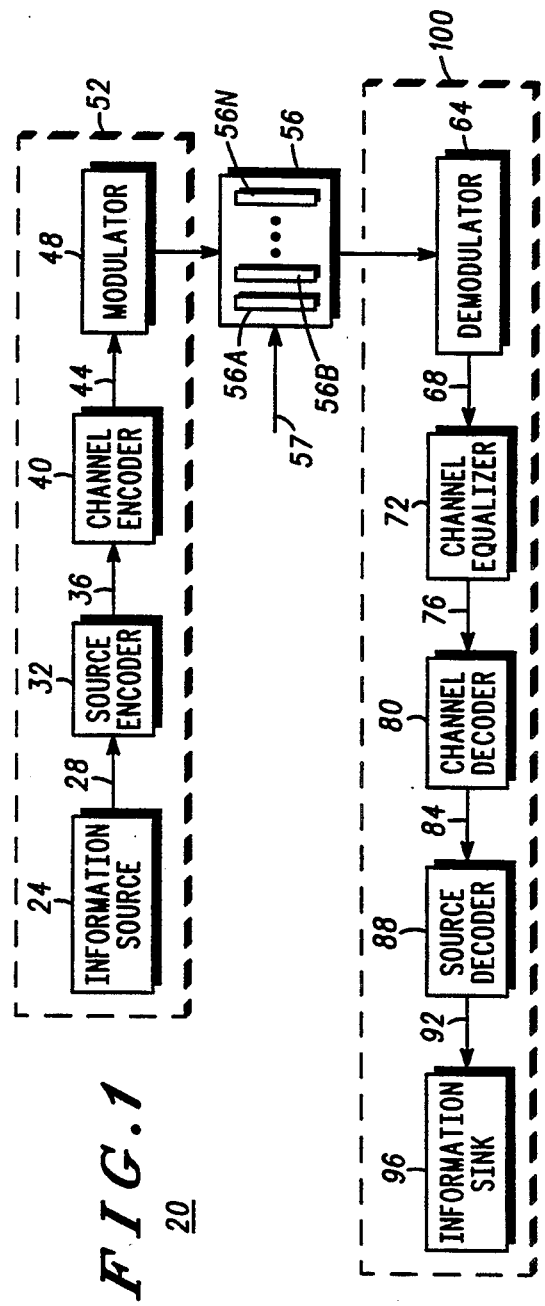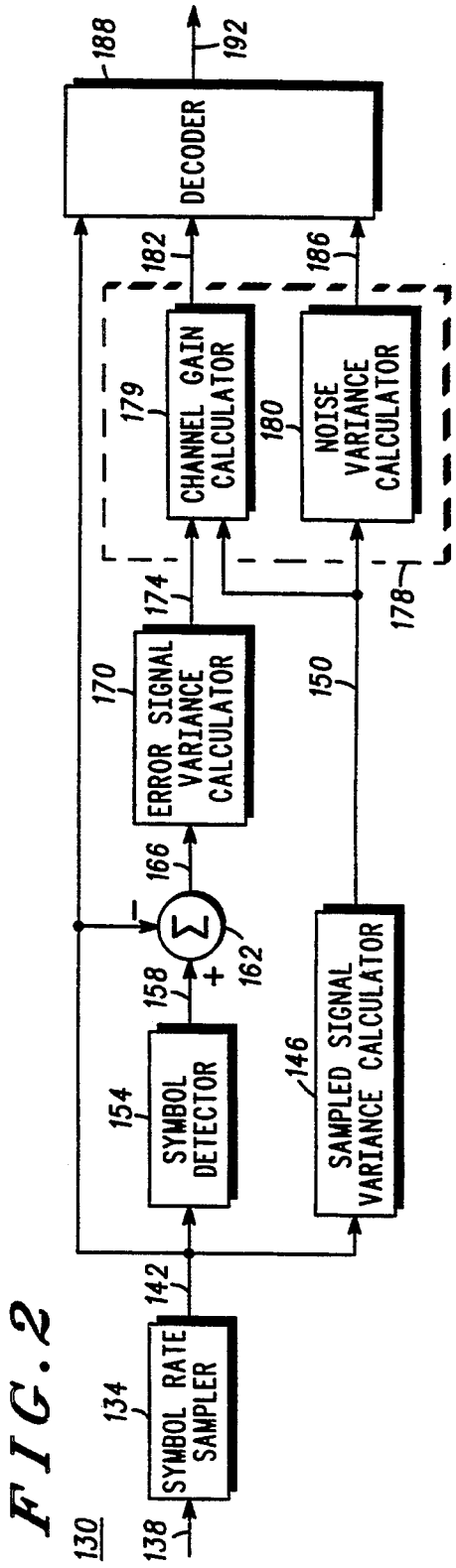

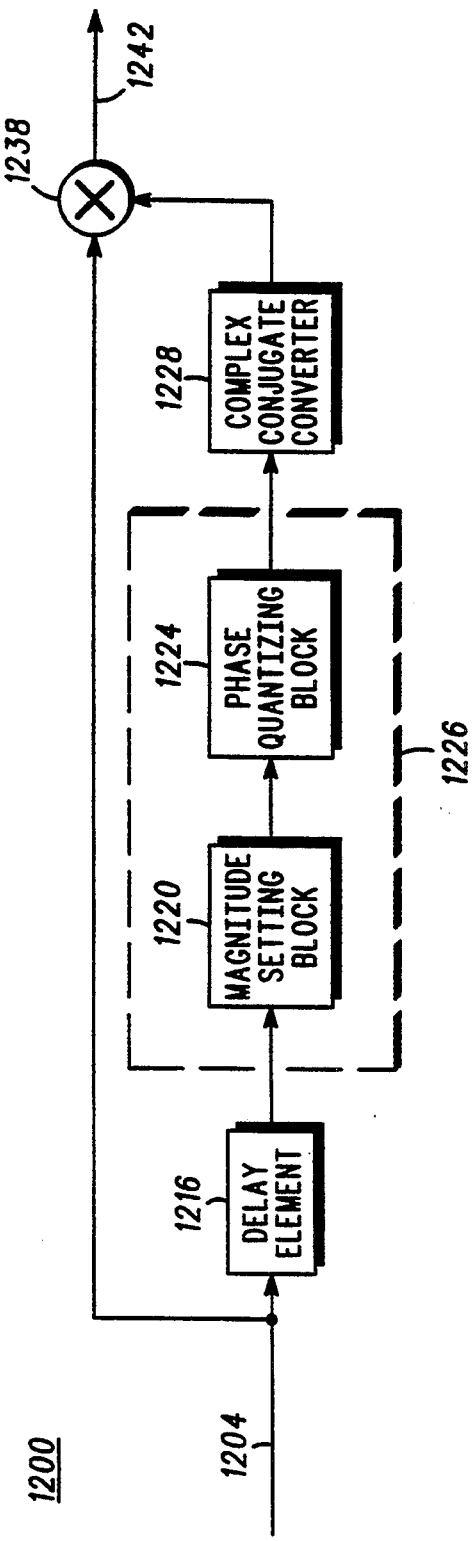
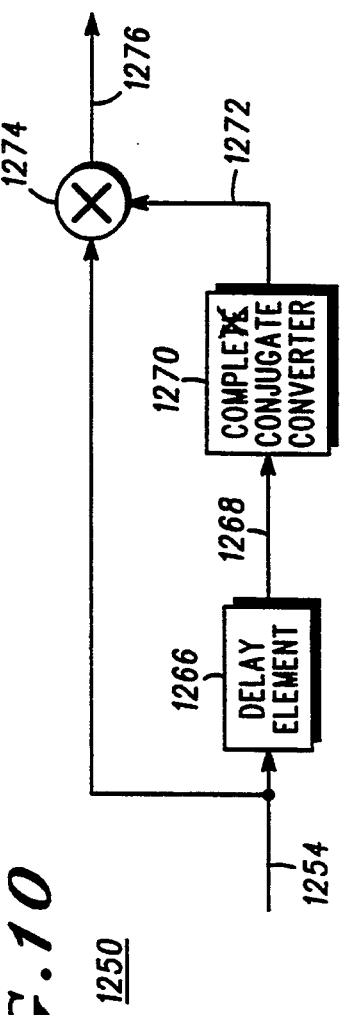

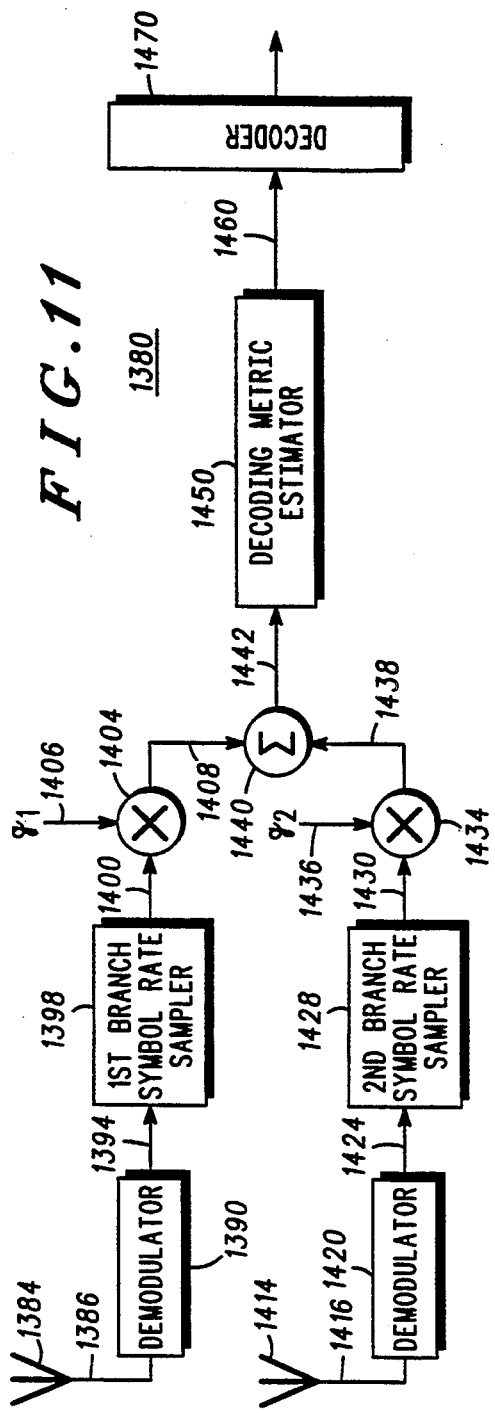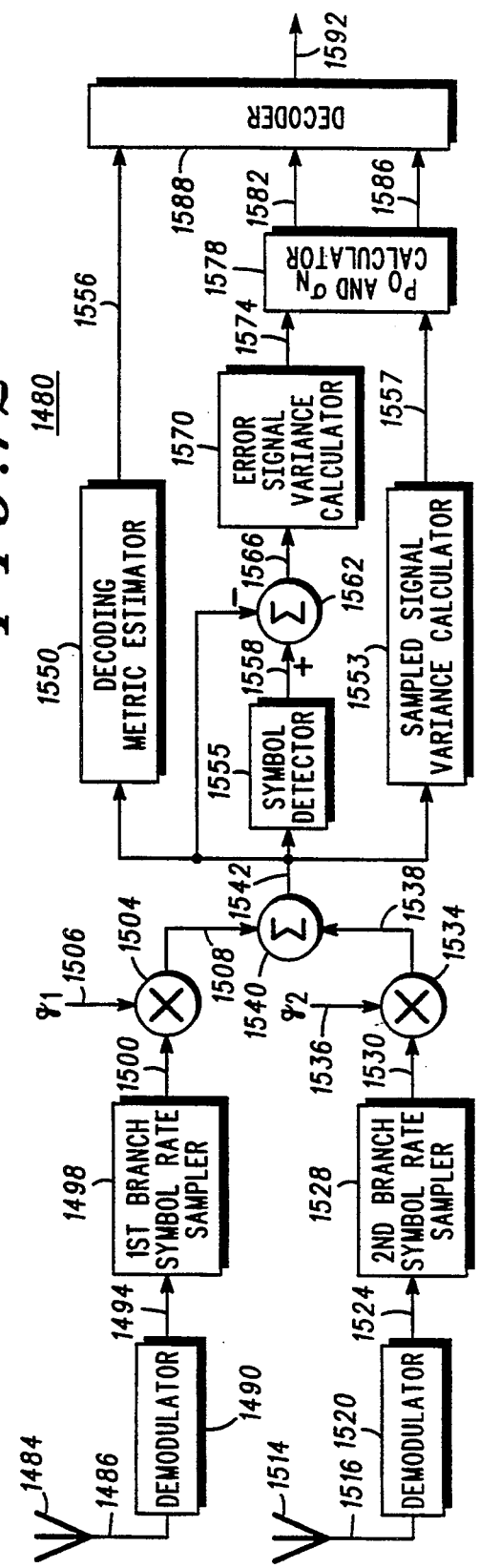

SYSTEM AND METHOD FOR CALCULATING CHANNEL GAIN AND NOISE VARIANCE OF A COMMUNICATION CHANNEL

CROSS-REFERENCE TO RELATED APPLICATIONS

This is a division of Ser. No. 724,663, filed Jul. 2, 1991, now U.S. Pat. No. 5,214,675 issued May 25, 1993.

BACKGROUND OF THE INVENTION

The present invention relates generally to digital receivers, and, more particularly, to a system, and an associated method therefor, for calculating channel gain and noise variance of a communication channel upon which an information signal is transmitted.

A communication system which transmits information between two locations includes, at a minimum, a transmitter and a receiver interconnected by a communication channel upon which an information signal (which contains information) may be transmitted.

A radio communication system comprises one type of communication system. The communication channel of a radio communication system is formed of a radio-frequency channel. The radio-frequency channel is defined by a range of frequencies of the electromagnetic frequency spectrum. To transmit an information signal upon the radio-frequency channel, the information signal must be converted into a form suitable for transmission thereof upon the radio-frequency channel.

Conversion of the information signal into the form suitable for the transmission thereof upon the radio-frequency communication channel is effectuated by a process referred to as modulation wherein the information signal is impressed upon a radio-frequency electromagnetic wave. The radio-frequency electromagnetic wave is of a characteristic frequency of a value within a range of values of frequencies which defines the radio-frequency channel. The radio-frequency electromagnetic wave of a characteristic frequency upon which the information signal is impressed is commonly referred to as a "carrier signal". The radio-frequency electromagnetic wave, once modulated by the information signal, is referred to as a modulated, information signal, or, more simply, a modulated signal. As the modulated signal contains the information to be transmitted between the transmitter and the receiver, the modulated signal is also commonly referred to as the communication signal.

The modulated signal is of a frequency bandwidth spanning a range of frequencies, sometimes referred to as the modulation spectrum of the modulated signal. The center frequency of the modulation spectrum is located at, or close to, the frequency of the carrier signal. Because the modulated signal may be transmitted through free space upon the radio-frequency channel, the transmitter and the receiver need not be positioned in close proximity to one another. As a result, radio communication systems are widely utilized to effectuate communication between two locations.

Many techniques for modulating an information signal to form the modulated signal thereby have been developed. Examples of such techniques include, for example, amplitude modulation (AM), frequency modulation (FM), phase modulation (PM), frequency-shift keying modulation (FSK), phase-shift keying modulation (PSK), and continuous phase modulation (CPM). One type of continuous phase modulation is Gaussian minimum shift keying modulation (GMSK). Another type of continuous phase modulation is quadrature amplitude modulation (QAM). A particular type of QAM modulation is filtered, differential quadrature phase shift keying (DQPSK) modulation.

The transmitter of the radio communication system contains circuitry for modulating an information signal according to a particular modulation technique, such as one of the techniques above-mentioned. The modulated signal formed thereby is transmitted upon the radio-frequency channel, and is received by the receiver of the communication system.

The receiver contains circuitry to detect, or to recreate otherwise, the information signal of the modulated signal transmitted thereto upon the communication channel. Such circuitry performs a process, referred to as demodulation, which is essentially the reverse of the modulation process.

Demodulation techniques have been developed analogous to corresponding ones of the modulation techniques to detect, or to recreate otherwise, the information content of a modulated signal. The circuitry of the receiver must be of a construction to demodulate a modulated signal by a demodulation technique corresponding to the modulation technique by which the modulated signal is formed by a transmitter which transmits the modulated signal thereto.

Typically, the circuitry of the receiver includes circuitry, sometimes consisting of several stages, to convert downward in frequency the modulated signal transmitted upon the communication channel.

Modulated signals generated by many different transmitters may be simultaneously transmitted as long as the simultaneously-transmitted, modulated signals do not overlap in frequency. By modulating information signals upon carrier signals of dissimilar frequencies, the modulated spectra of the resultant, modulated signals formed thereby are of bandwidths of frequencies to prevent such overlap.

Regulatory bodies have divided portions of the electromagnetic frequency spectrum into frequency bands, and have regulated transmission of modulated signals upon various ones of the frequency bands. The frequency bands have further been divided into channels, and such channels form the radio-frequency channels of a radio communication system. Regulation of the transmission of modulated signals within various ones of the frequency bands, and, more particularly, upon the channels into which the frequency bands have been divided, minimizes interference between simultaneously-transmitted, modulated signals.

For example, portions of a 100 megahertz frequency band extending between 800 megahertz and 900 megahertz are allocated in the United States for radio telephone communications. Such radio telephone communication includes radio telephone communication in a cellular, communication system. Conventionally, a radio telephone contains circuitry to permit simultaneous generation and reception of modulated signals, to permit thereby two-way communication between the radio telephone and a remotely-located transceiver.

A cellular, communication system is formed by positioning numerous base stations at spaced-apart locations throughout a geographical area. Each base station contains circuitry to receive modulated signals transmitted by one, or many, radio telephones.

The positioning of each of the base stations forming the cellular, communication system is carefully selected to ensure that at least one base station is positioned to receive a modulated signal transmitted by a radio telephone positioned at any location throughout the geographical area. That is to say, at least one base station must be within the transmission range of a radio telephone positioned at any such location throughout the geographical area. (Because the maximum signal strength, and, hence, maximum transmission range, of a signal transmitted by a base station is typically greater than the maximum transmission range, of a signal generated by a radio telephone, the maximum transmission range of a signal generated by a radio telephone is the primary factor which must be considered when positioning the base stations of the cellular, communication system.)

Because of the spaced-apart nature of the positioning of the base stations, portions of the geographical area throughout which the base stations are located are associated with individual ones of the base stations. Portions of the geographical area proximate to each of the spaced-apart base stations define "cells" wherein a plurality of cells, each associated with a base station, together form the geographical area encompassed by the cellular, communication system. A radio telephone positioned within the boundaries of any of the cells of the cellular, communication system may transmit, and receive, modulated signals to, and from, at least one base station.

Increased usage of cellular, communication systems has resulted, in many instances, in the full utilization of every available transmission channel of the frequency band allocated for radio telephone communication. As a result, various ideas have been proposed to utilize more fully the frequency band allocated for radio telephone communications. By more efficiently utilizing the frequency band allocated for radio telephone communication, the transmission capacity of an existing cellular, communication system may be increased.

The transmission capacity of the cellular, communication system may be increased by minimizing the modulation spectrum of the modulated signal transmitted by a transmitter. By reducing the bandwidth of the modulation spectrum, the radio-frequency channels upon which the modulated signals are transmitted may be reduced, thereby permitting a greater number of radio-frequency channels to be defined over a given frequency band.

Additionally, the transmission capacity of the cellular, communication system may be increased by minimizing the amount of time required to transmit a modulated signal. By minimizing the amount of time required to transmit the modulated signal, a greater number of modulated signals may be sequentially transmitted over a single radio-frequency channel.

By converting an information signal into discrete form prior to modulation thereof, and then modulating the discrete, information signal, the resultant, modulated signal is typically of a smaller modulation spectrum than a corresponding modulated signal comprised of an information signal that has not been converted into discrete form. Additionally, when the information signal is converted into discrete form prior to modulation thereof, the resultant, modulated signal may be transmitted in short bursts, and more than one modulated signal may be transmitted sequentially upon a single transmission channel.

Converting the information signal into discrete form is typically effectuated by an encoding technique, and apparatus which effectuates such conversion is referred to as an encoder. An encoded signal generated as a result of such an encoding technique may, for example, be in the form of a discrete binary data stream. The elements (i.e., bits) of the discrete binary data stream represents various characteristics of the information signal. The binary data stream comprising the coded signal may be appropriately filtered, and modulated by a modulation technique, as noted hereinabove, to form a modulated signal of a frequency appropriate for transmission upon a particular communication channel.

Transmission errors resulting in inaccurate detection or recreation of the information signal transmitted upon the transmission channel are primarily caused by three factors: 1.) spurious noise; 2.) intersymbol interference, and 3.) Rayleigh fading.

Spurious noise includes noise generated within electrical circuitry, such as thermal noise, as well as noise caused by transient signals or overlapping signals transmitted upon adjacent communication channels.

Intersymbol interference is caused by reflection of a single, transmitted signal of of man-made and/or natural objects. Although only a single modulated signal is generated and transmitted by a transmitter, the signal received by the receiver is actually the summation of a plurality of signals transmitted to the receiver over a plurality of signal paths. An actual (i.e., nonideal) radio-frequency channel upon which a signal is transmitted is therefore sometimes referred to as a multipath channel as a signal transmitted upon the channel is received by a receiver after transmission thereto over the plurality of different signal paths.

Transmission of the signal over any but a direct path results in propagation delay, and such propagation delay results in a receiver receiving the some signal, but delayed in time responsive to the signal path of the transmitted signal during transmission of the signal upon the radio-frequency channel. As the signal paths can be of various path lengths, a receiver actually receives the same signal a plurality of times corresponding to the plurality of paths of the multipath channel.

Significant propagation delay results in a signal delay resulting in interference between sequentially transmitted signal bits of the transmitted signal. Such interference is intersymbol interference.

Rayleigh fading is associated with intersymbol interference in that Rayleigh fading is caused by reception of a modulated signal transmitted over a plurality of channels. Propagation delays of time periods not great enough to cause intersymbol interference do, however, cause variance in magnitude and phase of the signal level received by the receiver. Such variance in magnitude and phase is Rayleigh fading.

Intersymbol interference and Rayleigh fading degrade receiver performance. Receiver performance is, at least in part dependent upon a channel gain characteristic of the channel upon which a signal is transmitted. Channel gain is a relative value which is representative of the magnitude of a signal received by a receiver (and is, hence, also representative of the attenuation of a signal transmitted upon the channel). Receiver performance is also dependent, in part, upon the noise variance of the signal received by a receiver. Noise variance is a statistical property of the magnitude of a noise component, which includes spurious noise, of a signal received by a receiver. Both channel gain and noise variance are time varying values, and values of channel gain and noise variance are additionally dependent upon levels of intersymbol interference and Rayleigh fading.

Several existing receiver constructions include circuitry to attempt to correct for intersymbol interference and Rayleigh fading to minimize receiver error resulting therefrom. For instance, one such existing receiver construction attempts to correct for such transmission error by altering the value of the received signal by a constant factor. Such an attempt, in essence, assumes that channel gain and noise variance are constant values. Therefore, such an attempt to correct for transmission error is inherently erroneous as the channel gain and noise variance of the communication channel are not constant values.

Another existing receiver construction attempts to correct for such transmission error by estimating the magnitude of the channel gain by first measuring the variance of the received signal and then calculating a square root of the measured variance of the received signal. Such an estimation is inherently erroneous when the noise variance is not relatively constant.

What is needed, therefore, is an improved means for determining the values of the actual channel gain of a signal transmitted upon a communication channel.

SUMMARY OF THE INVENTION

The present invention, accordingly, advantageously provides improved means for determining characteristics of a communication channel interconnecting a transmitter and a receiver.

The present invention further advantageously provides a receiver for receiving and decoding a coded, communication signal transmitted thereto upon a communication channel.

The present invention yet further advantageously provides a diversity receiver for receiving and decoding a coded, communication signal transmitted thereto upon a communication channel.

The present invention yet further provides a receiver having an adaptive equalizer for receiving and decoding a coded, communication signal transmitted upon a communication channel.

The present invention provides further advantages and features, details of which will become more apparent by reading the detailed description of the preferred embodiment hereinbelow.

In accordance with the present invention, therefore, a system for determining at least one characteristic of a communication channel interconnecting a transmitter and a receiver is disclosed. The system determines values of at least sampled portions of a received signal received by the receiver subsequent to transmission thereof upon the communication channel. The variance of the values of at least portions of the received signal is calculated. The values of the at least sampled portions of the received signal are quantized to form quantized values thereby. An error signal is formed responsive to differences between the values of the least sampled portion of the received signal and corresponding quantized values of the at least sampled portions of the received signal. The variance of the error signal is calculated, and a channel gain characteristic of the communication channel is calculated responsive to values of the variance of the at least sampled portions of the received signal and of the variance of the error signal.

BRIEF DESCRIPTION OF THE DRAWINGS

The present invention will be better understood in light of the accompanying drawings in which:

FIG. 1 is a block diagram of a communication system operable to transmit and to receive a digitally-encoded information signal wherein the transmission channel comprises a multi-path channel;

FIG. 2 is a block diagram of a receiver constructed according to a preferred embodiment of the present invention;

FIG. 9 is a block diagram of circuitry operative to receive a coherent, modulated signal;

FIG. 10 is a block diagram of circuitry operative to receive a noncoherent, modulated signal;

FIG. 11 is a block diagram of a receiver operative to receive a noncoherent, modulated signal and which includes the circuitry of FIG. 10; and FIG. 12 is a block diagram of a receiver operative to receive a modulated signal which includes the circuitry of FIG. 9.

DESCRIPTION OF THE PREFERRED EMBODIMENTS

Figure 3:
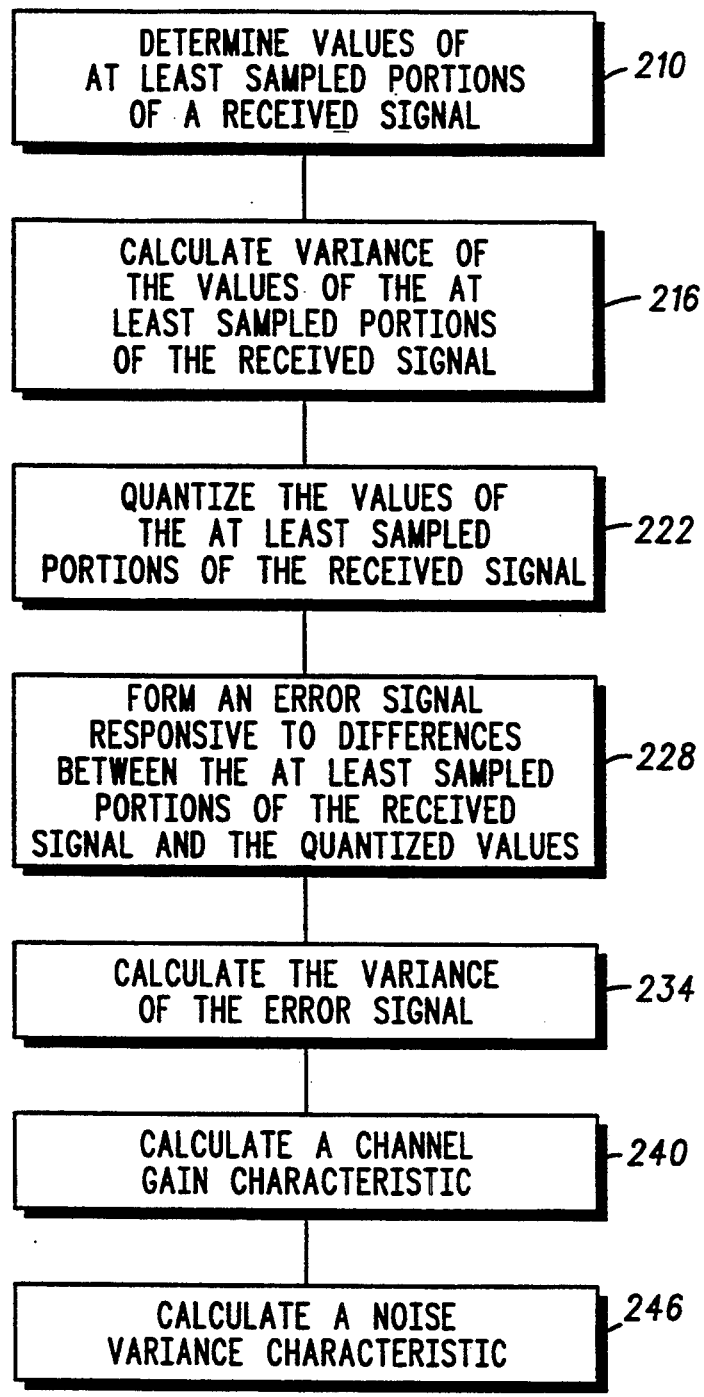
FIG. 3 is a flow diagram listing the method steps of the method of a preferred embodiment of the present invention.

Referring first to the block diagram of FIG. 1, a radio communication system, referred to generally by reference numeral 20, is shown. Radio communication system 20 of FIG. 1 is formed of a digital transmitter and digital receiver interconnected by a communication channel, and is operable to transmit and to receive digitally-encoded information signals.

An information source, represented in the figure by block 24, is representative of the source of an information signal, such as, for example, a voice signal or a data signal. When information source 24 forms a voice signal, information source 24 includes a transducer, or other suitable circuitry, for converting the voice signal into an electrical signal of desired characteristics.

Information source 24 generates a signal on line 28 which is supplied to source encoder 32. Typically, the signal generated by the information source 24 on line 28 is analog in form. Source encoder 32 converts the analog signal supplied thereto into a digitally-encoded signal. Source encoder 32 is preferably comprised of an analog-to-digital converter. The digitally-encoded signal formed by encoder 32 is generated on line 36 which is supplied to channel encoder 40.

Channel encoder 40 encodes the digital signal supplied thereto according to a coding technique. Typically, channel encoder 40 is comprised of a block and- /or convolutional encoder to convert digital signal applied thereto into an encoded form to increase the redundancy of the signal thereby. By increasing the redundancy of the signal, transmission errors and other signal distortions caused during transmission of a signal are less likely to result in erroneous interpretations of the information content of the actual, transmitted signal.

An encoded signal generated by channel encoder 40 is supplied on line 44 to modulator 48. Modulator 48 modulates the encoded signal supplied thereto according to a modulation technique onto a radio frequency carrier. As mentioned previously, one such modulation technique by which the digital, encoded signal may be modulated includes a quaternary phase shift keying (QPSK) modulation technique.

Information source 24, source encoder 32, channel encoder 40, and modulator 48 together comprise the transmitter, indicated by block 52 shown in hatch, of communication system 20.

Modulator 48 of transmitter 52 generates a modulated signal which may be transmitted through free space upon a communication channel, indicated in the figure by block 56. As noted previously, an actual (i.e., nonideal) communication channel forms a multipath channel. Spurious noise may also be present on the channel, and is indicated in the figure by arrow 57. Individual paths of the multipath channel are indicated in the figure by longitudinally extending blocks 6A, 56B, ... 56N positioned within block 56. Each of the paths 56A-56N has associated therewith a time-varying channel gain (which is also associated with a level of attenuation).

If not compensated for, Rayleigh fading results in degradation of the quality of the communication between the transmitter and the receiver.

The modulated signal transmitted upon paths 56A-56N of communication channel 56 is received by demodulater 64. As the path lengths of the different paths vary, the signal transmitted by the transmitter 52 is received by demodulator 64 at different times responsive to propagation delay corresponding to the lengths of the various paths. Demodulator 64 demodulates the modulated signal received thereat by a technique corresponding to the modulation technique by which the signal modulated by modulator 48 was modulated.

Demodulator 64 generates a demodulated signal on line 68 which is supplied to channel equalizer 72. Channel equalizer 72 preferably forms a portion of system 20 when significant propagation delay on paths of the multipath channel causes significant intersymbol interference. Equalizer 72 corrects for intersymbol interference which is introduced upon the modulated signal as a result of transmission thereof upon a multipath channel. Channel equalizer 72 generates a signal on line 76 which is supplied to channel decoder 80. When system 20 does not include equalizer 72, the demodulated signal generated by demodulator 72 is supplied directly to decoder 80.

Channel decoder 80 corresponds to channel encoder 40 of transmitter 52, but functions to decode the encoded signal. Channel decoder 80 generates a decoded signal, in digital form, which is supplied on line 84 to source decoder 88.

Source decoder 88 converts the digital signal supplied thereto into a form suitable for application thereof on line 92 to information sink 96. Information sync 96 may, for example, comprise an earpiece or speaker portion of a receiver, or another such transducer, for converting the electrical signal comprising the decoded signal generated by source decoder 88 into human perceptible form.

Demodulator 64, channel equalizer 72, channel decoder 80, source decoder 88, and information sink 96 together comprise the receiver, indicated in the figure by block 100, shown in hatch, of communication system 20.

Because Rayleigh fading results in degradation of the quality of the received signal, attempts have been made to correct for the effects of such fading. However, as noted hereinabove, existing means for correcting for the effects of such fading are, at least in some instances, inadequate.

FIG. 2 is a block diagram of the system of a preferred embodiment of the present invention for adaptively calculating values of the channel gain and noise variance of a communication channel, such as channel 56 of FIG. 1.

The system, referred to generally by reference numeral 130, includes symbol rate sampler 134 which samples a demodulated signal supplied thereto on line 138. Symbol rate sampler 134 may, for example, be comprised of an analog-to-digital converter. Symbol rate sampler 134 generates a sampled signal on line 142. The sampled signal generated on line 142 is supplied to sampled signal variance calculator 146. Calculator 146 calculates the statistical variance of the sampled signal supplied thereto, and generates a signal on line 150 indicative of the variance of the sampled signal.

The sampled signal generated on line 142 is additionally supplied to symbol detector 154 which quantizes the signal supplied thereto. The values into which symbol detector 154 quantizes the signal supplied thereto are values of an allowable signal set. For instance, in a QPSK receiver, symbol detector 154 quantizes the signal supplied thereto on line 142 into any of the four different, allowable signal values of a QPSK signal. Symbol detector 154 generates a signal on line 158 indicative of the signal quantized thereat.

Line 158 is coupled as an input to summing element 162. The sampled signal generated on line 142 is coupled, as a negative input, to summing element 162. Summing element 162 generates a difference signal forming an error signal on line 166. Line 166 is coupled to error signal variance calculator 170. Calculator 170 calculates in variance of the error signal supplied thereto on line 166 and generates a signal on line 174 of a value indicative of the error signal variance.

Line 174 is coupled to channel gain and noise variance calculator 178. Line 150 upon which the sampled signal variance calculator 146 generates a signal indicative of the sample signal variance is additionally coupled to calculator 178.

Calculator 178 calculates values of the channel gain and noise variance of the communication channel upon which the signal transmitted to a receiver (of which system 130, in a preferred embodiment of the present invention, forms a portion).

Calculator 178 generates signals on lines 182 and 186 which are supplied to decoder 188. Decoder 188 additionally receives the sampled signal generated by symbol rate sampler 134 on line 142. Decoder 188 decodes the sampled signal supplied thereto according to a decoding technique, such as a Viterbi algorithm. Because adaptive values of the channel gain and the noise variance of the communication channel are additionally applied to decoder 188, the decoded signal generated by decoder 188 on line 192 is able to recreate more accurately an information signal modulated to form a modulated signal and transmitted upon a communication channel.

Turning now to the flow diagram of FIG. 3, the method steps of a preferred embodiment of the method of the present invention are listed. The elements of system 130 of FIG. 2 are preferably embodied in an algorithm executable by processing apparatus. The method of the flow diagram comprises an adaptive method for determining at least one characteristic of a communication channel interconnecting a transmitter and a receiver.

First, and as indicated by block 210, values of at least sampled portions of a received signal received by the receiver subsequent to transmission thereof upon the communication channel are determined. With respect to the block diagram of the preferred embodiment of FIG. 2, such step is performed by symbol rate sampler 134.

Next, and as indicated by block 216, the variance of the values of the at least sampled portions of the received signal are calculated. With reference again to the block diagram of FIG. 2, such step is performed by sampled signal variance calculator 146.

Next, and as indicated by block 222, the values of the at least sampled portions of the received signal are quantized to form quantized values thereby. Sample detector 154 of the block diagram of FIG. 2 performs such step.

Next, and as indicated by block 228, an error signal responsive to differences between the values of the at least sampled portion of the received signal and corresponding quantized values of the at least sampled portions of the received signal is formed. Referring again to the block diagram of the preferred embodiment of FIG. 2, such a step is carried out by summing block 162 to generate the error signal on line 166.

Next, and as indicated by block 234, the variance of the error signal is calculated. Block 170 of the block diagram of FIG. 2 is operative to carry out such step.

Finally, and as indicated by block 240, a channel gain characteristic of the communication channel responsive to values of the variance of the at least sampled portions of the received signal and of the variance of the error signal is calculated. Referring again to the block diagram of FIG. 2, such a step is carried out by calculator 178.

In a preferred embodiment of the method of the present invention, the method comprises the further step, as as indicated by block 246, of calculating a noise variance characteristic of the communication channel responsive to values of the variance of the at least sampled portions of the received signal and the channel gain characteristic of the communication channel.

Referring again to the block diagram of FIG. 2, in a preferred embodiment of the present invention, system 130 forms a portion of a digital receiver. In such an embodiment, a signal transmitted upon a communication channel, denoted by the variable x(t), is received by the receiver, demodulated, and supplied on line 138 to symbol rate sampler 134. The received signal is denoted by the variable r(t). Symbol rate sampler 134 generate a sample signal, denoted on line 142 as r(k).

The received signal may be represented by the equation:

$$r(k) = p_o(k) \times (k) + n(k)$$

where:
$p_o(k)$ is the channel gain of a communication channel upon which a communication signal, x(t), is transmitted;
n(k) is the noise of the communication channel; and
x(k) is the transmitted signal, in discrete form.

The sampled signal, r(k), generated on line 142 is supplied to variance calculator 146. Variance of the sampled signal is defined by the following equation:

$$\sigma_r^2(k) = E\{r^2(k)\} = E\{(p_o(k) \times (k) + n(k))^2\}$$

where:
$p_o(k)$ is the channel gain of a communication channel upon which a communication signal, x(t), is transmitted;
n(k) is the noise of the communication channel (as sampled by sampler 134); and
E denotes the expected value of a signal.

When x(k) and n(k) are uncorrelated and the magnitude of x(k) is 1 (i.e., $|x(k)|=1$), algebraic simplification of the above equation is as follows:

$$\sigma_r^2(k) = E\{p_o^2(k)\} + E\{n^2(k)\}$$

and then:

$$\sigma_r^2(k) = p_o^2(k) + \sigma_n^2(k)$$

where:
$\sigma_n^2(k)$ is the variance of the noise present on the communication channel.

The error signal generated by summing element 162, denoted by e(k) is generated on line 166, and is supplied to variance calculator 170. The variance of the error signal is defined by the following equation:

$$\sigma_e^2(k) = E\{e^2(k)\} = E\{(r(k) - x(k))^2\}$$

By substitution (and ignoring incorrect signal decisions), the variance of the error signal may be written as follows:

$$\sigma_e^2(k) = p_o^2(k) + \sigma_n^2(k)$$

where:
$\sigma_n^2(k)$ is the variance of the noise present on the communication channel.

By substitution of the variance of the received, sampled signal at both sides of the above equation, the following equation may be obtained:

$$\sigma_r^2(k) - \sigma_e^2(k) = 2p_o(k) - 1$$

Solving for $p_o(k)$, the channel gain is as follows:

$$p_o(k) = (\sigma_r^2(k) - \sigma_e^2(k) + 1)/2$$

Calculator 178 is operative to calculate adaptively the above equation to determine an adaptive value of the channel gain, $p_o(k)$ responsive to values of the sample signal variance, $\sigma_r^2(k)$ on line 150, and the error signal variance, $\sigma_e^2(k)$, generated on line 174.

Calculator 178 is further operative to calculate the noise variance of the communication channel upon which a signal is transmitted to a receiver. By substitution of the calculated value of the channel gain, $p_o(k)$, into a previously-listed equation, the value of the noise variance, $\sigma_n^2(k)$ may be determined as follows:

$$\sigma_n^2(k) = \sigma_r^2(k) - p_o^2(k)$$

Values of the channel gain and the noise variance calculated by calculator 178 and generated on lines 182 and 186, respectively, is supplied to decoder 188.

Figure 4:
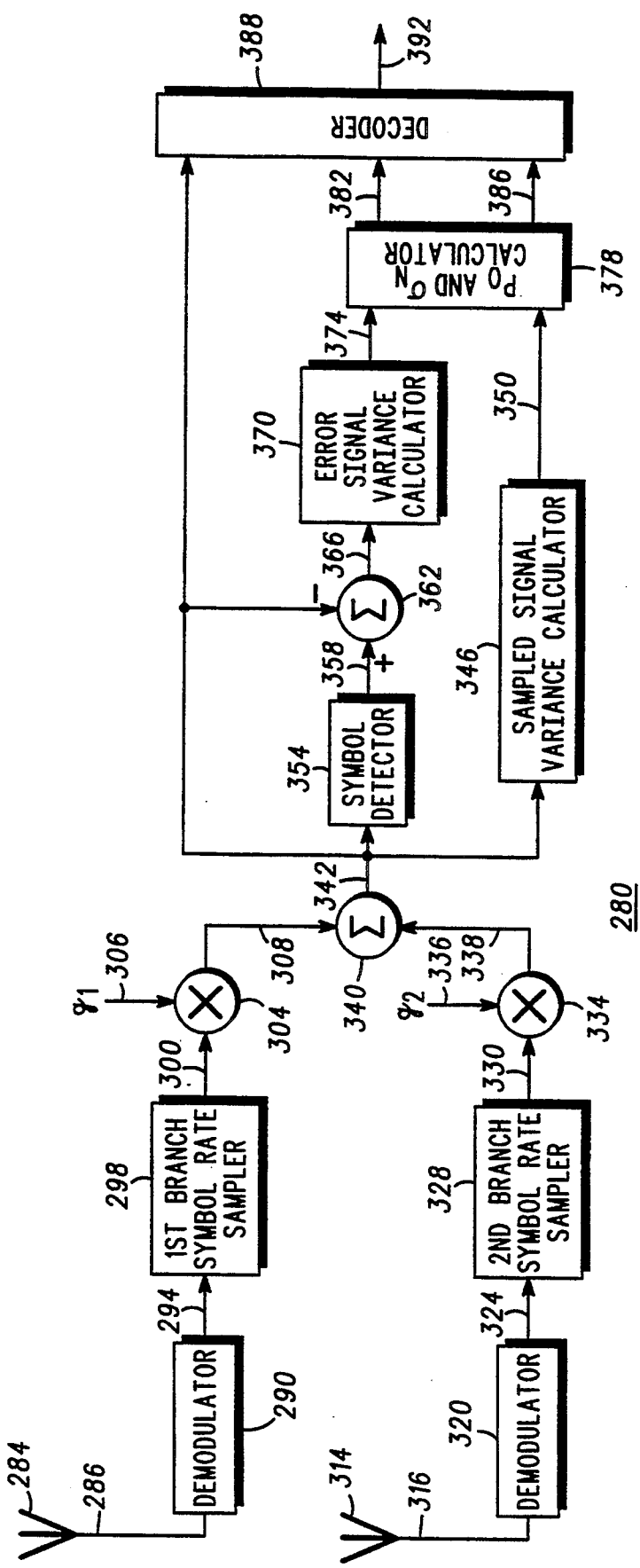
FIG. 4 is a block diagram of a diversity receiver utilizing the system of a preferred embodiment of the present invention.

Turning now to the block diagram of FIG. 4, a diversity receiver, referred to generally by reference numeral 280, of a preferred embodiment of the present invention is shown. A diversity receiver is operative to combine two or more signals received at two or more locations. While diversity receiver 280 of FIG. 4 is comprised of two separate branches, it is to be understood, of course, that diversity receiver 280 could similarly be comprised of more than two branches with appropriate circuitry alterations.

A first branch of diversity receiver 280 is comprised of antenna 284 for detecting a modulated signal transmitted upon a communication channel thereto. Antenna 284 supplies a received signal, $r_1(t)$, on line 286 to demodulater 290. Demodulator 290 generates a demodulated signal indicative of the signal received by antenna 284 on line 294. Line 294 is coupled to first branch symbol rate sampler 298 which, similar to symbol rate sampler 134 of FIG. 2 samples the signal supplied thereto and generates a sampled signal on line 300. Line 300 is coupled to an input of first branch mixer 304 which also receives a gain coefficient, indicated by $g_1$, on line 306. First branch mixer 304 generates a mixed signal on line 308.

Diversity receiver 280 additionally is comprised of a second branch formed of antenna 314 which is spaced-apart from antenna 284. Antenna 314 is operative to receive a modulated signal transmitted thereto on a communication channel. Antenna 314 supplies a received signal, denoted by $r_2(t)$, on line 316 to demodulator 320. Demodulator 320 generates a demodulated signal on line 324 which is supplied to second branch symbol rate sampler 328. Symbol rate sampler 328 is operative in a manner similar to symbol rate sampler 298 of the first branch of the receiver 280 to sample the signal supplied thereto on line 324 and to generate a sampled signal on line 330. Line 330 is coupled to an input of second branch mixer 334. A gain coefficient, indicated by $g_2$, is also supplied to a second input of mixer 334 on line 336. Second branch mixer 334 generates an output signal on line 338.

Lines 308 and 338 are coupled to form inputs to summing element 340. Summing element 340 generates a summed signal on line 342 denoted by $r_c(t)$. The combined, sample signal generated on line 342 by summing element 340 is supplied to sampled signal variance calculator 346. Calculator 346, analogous to calculator 146 of FIG. 2, is operative to calculate the variance of the combined, sampled signal supplied thereto on line 342. The signal indicative of the variance calculated by calculator 346 is generated on line 350.

Line 342 is also coupled to sampled signal variance calculator 342 and to symbol detector 354. Symbol detector 354 is operative in a manner similar to that of bit slicer 154 of FIG. 2, and is operative to quantize the signal supplied thereto on line 342. Symbol detector 354, in a preferred embodiment of the present invention, quantizes the summed signal supplied thereto into one of the four allowable signal level values permitted of a QPSK signal. The quantized signal generated by sample detector 354, denoted by $r_c(k)$ is generated on line 358 and supplied to summing element 362. Summing element 362, analogous to summing element 162 of FIG. 2, is additionally coupled to receive the combined, sampled signal generated by summing element 340 on line 342. Summing element 362 determines the difference, referred to as error signal e(k), between the quantized signal supplied thereto on line 358 and the combined, sampled signal supplied thereto on line 342 and generates a signal indicative of such difference on line 366. Line 366 is coupled to error signal variance calculator 370.

Error signal variance calculator 370, analogous to calculator 170 of FIG. 2, is operative to calculate the variance of the error signal supplied thereto on line 366. Calculator 370 generates a signal indicative of such calculated variance on line 374.

Lines 350 and 374 are coupled to channel gain and noise variance calculator 378. Calculator 378, analogous to calculator 178 of FIG. 1, is operative to calculate the channel gain and noise variance of the communication channel upon which a signal x(t) is transmitted to antennas 284 and 314. Calculator 378 generates signals on lines 382 and 386 indicative of calculated values of channel gain and noise variance, respectively.

Lines 382 and 386 are coupled to decoder 388. Decoder 388 is also supplied with the sampled, combined signal generated by summing element 340 on line 342. Decoder 388 is operative, in a manner analogous to that of decoder 188 of FIG. 2, to decode the summed, sampled signal supplied thereto on line 342. Because decoder 386 receives signals on lines 382 and 386 indicative of the channel gain and the noise variance of the communication channel, decoder 388 generates a decoded signal on line 392 of improved accuracy.

The signal received by antenna 284 of the first branch of diversity receiver 280, demodulated by demodulator 290 and sampled by first branch symbol rate sampler 298 may be represented by the following equation:

$$r_1(k) = p_{o1}(k) \times (k) + n_1(k)$$

where $r_1(k)$ represents the sampled signal formed responsive to the signal received by the first branch of the receiver;

$P_{o1}(k)$ represents the channel gain of the communication channel upon which a signal is transmitted to antenna 284 of the first branch of receiver 280;

x(k) represents a sampled portion of the signal actually transmitted by a transmitter upon the communication channel; and $n_1(k)$ represents the noise of the communication channel upon which the signal is transmitted to antenna 284.

Similarly, the signal received by the antenna 314 of the second branch of diversity receiver 280, demodulated by demodulator 320, and sampled by second branch symbol rate sampler 328, may be represented by the following equation:

$$r_2(k) = p_{o2}(k) \times (k) + n_2(k)$$

where:

$r_2(k)$ represents the sampled signal formed responsive to the signal received by the second branch of the receiver;

$p_{o2}(k)$ represents the channel gain of the communication channel upon which a signal is transmitted to antenna 314 of the second branch;

x(k) represents a sampled portion of a signal actually transmitted upon the communication channel; and $n_2(k)$ represents the noise of the communication channel upon which the signal is transmitted to antenna 314.

The summed signal generated by summing element 340 is defined by the following equation:

$$r_c(k) = g_1(k)r_1(k) + g_2(k)r_2(k)$$

where:

$g_1(k)$ represents a gain coefficient applied on line 306 to first branch mixer 304; and $g_2(k)$ represents the gain coefficient of the signal applied on line 336 to first branch mixer 334.

By substitution, and algebraic simplification, the above equation may be written as follows:

$$r_c(k) = (g_1(k)p_{o1}(k) + g_2(k)p_2(k)) \times (k) + g_1(k)n_1(k) + g_2(k)n_2(k)).$$

By defining a channel gain of the combined signal to be:

$$p_{oc}(k) = g_1(k)p_{o1}(k) + g_2(k)p_{o2}(k)$$

and the noise of a combined channel to be:

$$n_c(k)g_1(k)n_1(k) + g_2(k)n_2(k)$$

then the noise variance of the combined signal may be defined as follows:

$$\text{Var}[n_c(k)] = \sigma_{nc}^2(k) = g_2(k)\sigma_{n1}^2(k) + g_2^2(k)\sigma_{n2}^2(k)$$

and, the combined signal may be defined by the following equation:

$$r_c(k) = p_{oc}(k) \times (k) + n_c(k).$$

As the above equation is identical to that of a signal received, demodulated, and sampled by a receiver which supplies a signal on line 138 to circuit 130 of FIG. 2, the equations used to describe operations of system 130 of FIG. 2 may similarly be utilized to define operation of diversity receiver 280. Mathematical substantiation of the operation of the right-hand side portion of diversity receiver 280 may, therefore, be described by appropriate substitution of the equations listed hereinabove.

Figure 5:
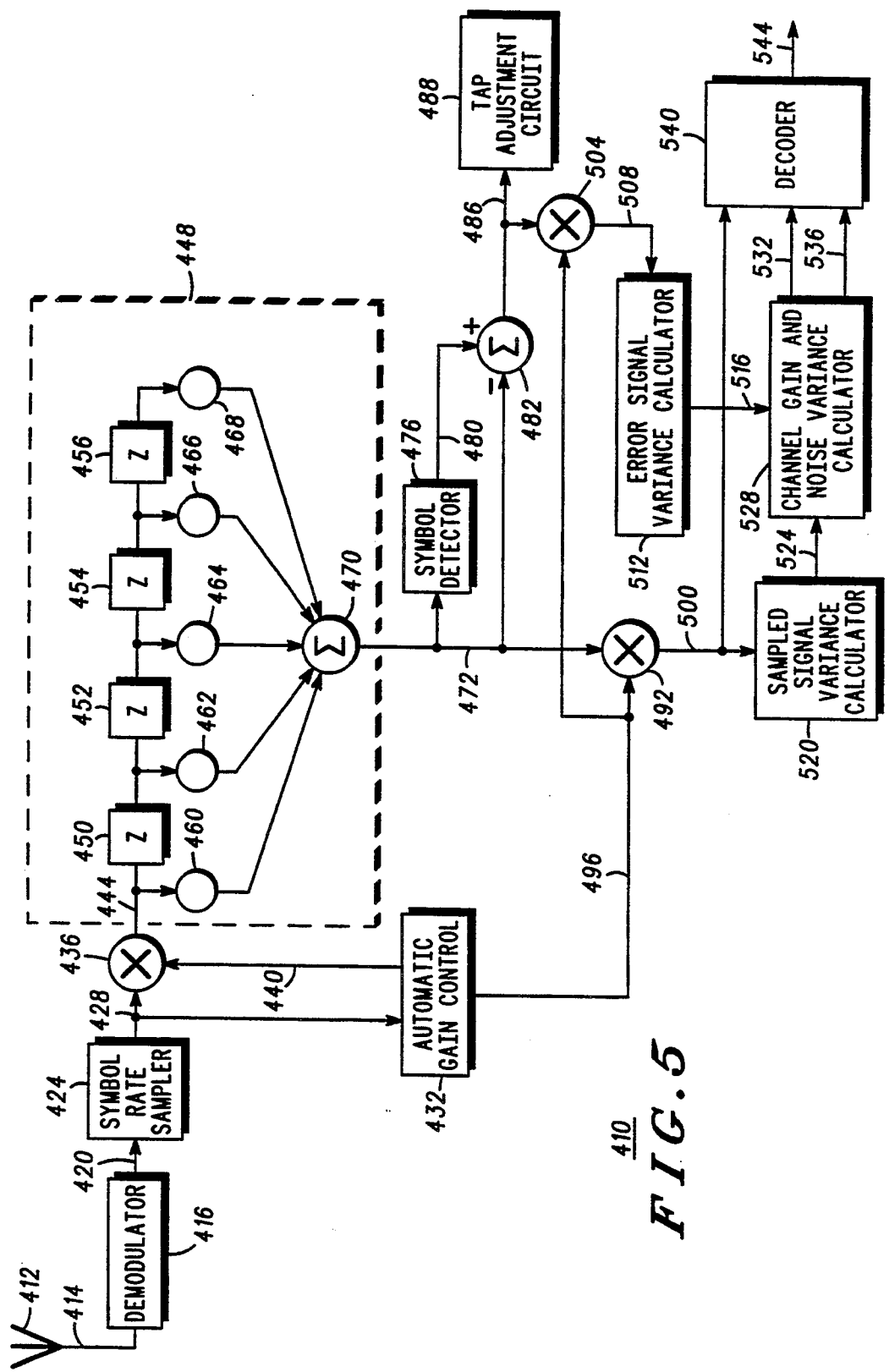
FIG. 5 is a block diagram of a linear transversal equalizer (LTE) of a preferred embodiment of the present invention.

Turning now to the block diagram of FIG. 5, there is shown an alternate, preferred embodiment of the present invention incorporating the system 130 of FIG. 2 as a portion thereof. The receiver, referred to generally by reference numeral 410 includes an adaptive, linear transversal equalizer (LTE) which corrects for intersymbol interference of a signal transmitted upon a multi-path communication channel. Additionally, because receiver 410 includes circuitry similar to that of the circuitry of system 130 of FIG. 2, interference caused by Rayleigh fading is removed to decode more accurately the received signal.

A signal transmitted to antenna 412 upon the communication channel is supplied on line 414 to demodulator 416 which generates a demodulated signal on line 420. Line 420 is coupled to symbol rate sampler 424 which generates a sampled signal on line 428.

The sampled signal sampled by sampler 424 on line 428 is supplied o to automatic gain control (AGC) circuit 432 and to an input of mixer 436. AGC circuit 432 generates a signal on line 440 which is supplied to a second input of mixer 436. Mixer 436 is operative to remove the gain of the signal generated on line 428 when the signal generated by AGC circuit 432 is the inverse of the gain of the signal. Mixer 436 generates a mixed signal on line 444 which forms an input to equalizer 448, here shown to be a linear transverse equalizer (LTE). Equalizer 448 of FIG. 5 is a five-tap equalizer having delay elements 450, 452, 454, and 456, and coefficient blocks 460, 462, 464, 466, and 468. Summing element 470 of equalizer 448 sums the values taken at the respective taps of the equalizer theretogether, as is conventional, and generates a filtered (i.e., equalized) signal on line 472.

Line 472 is coupled to symbol detector 476 which quantizes the signal supplied thereto and generates a quantized signal on line 480. Line 480 is coupled as an input to summing element 482. Line 472 is also coupled as an input to summing element 482 which determines the difference between the two signals supplied thereto and generates a signal indicative thereof on line 486 which is coupled to tap adjustment circuit 488. Circuit 488 is operative to alter the coefficient values of the coefficient blocks 460–468 of equalizer 448.

The filtered signal generated on line 472 is additionally supplied to an input of mixer circuit 492. Mixer circuit 492 is also supplied with a gain control signal generated by AGC circuit 432 on line 496. Mixer circuit 492 generates a mixed signal on line 500.

The signal generated on line 486 is additionally supplied to a first input of mixer circuit 504. The gain control signal generated by AGC circuit 432 on line 496 is supplied to a second input to mixer circuit 504.

Mixer circuit 504 generates a mixed signal on line 508 which is supplied to error signal variance calculator 512. Calculater 512 calculates the variance of the signal supplied thereto on line 508, and generates a signal indicative of such variance on line 516.

The signal generated by mixer 492 on line 500 is supplied to sampled signal variance calculator 520. Sampled signal variance calculator 520 calculates the variance of the signal supplied thereto, and generates a signal indicative of such variance on line 524.

Lines 516 and 524 are coupled to channel gain and noise variance calculator 528. Calculator 528 is operative, in manners similar to calculators 378 of FIG. 4 and 178 of FIG. 2, to calculate values of the channel gain and noise variance of a communication channel upon which a signal is transmitted to receiver 410.

Signals indicative of the values of channel gain and noise variance calculated by calculator 528 are generated on lines 532 and 536, respectively, which are coupled to decoder 540. Line 500 is also coupled to the decoder. Decoder 540 is operative to decode the signal supplied thereto on line 500, and to generate a decoded signal on line 544. Because decoder 540 receives signals on lines 532 and 536 indicative of the channel gain and noise variance calculated by calculator 528, the decoded signal generated by decoder on line 540 and line 544 contains fewer errors than that capable of existing receivers. This configuration advantageously avoids imposing a gain on the signal generated thereby. Imposition of an unknown, time-varying gain would otherwise detrimentally affect the decoding process.

Figure 6:
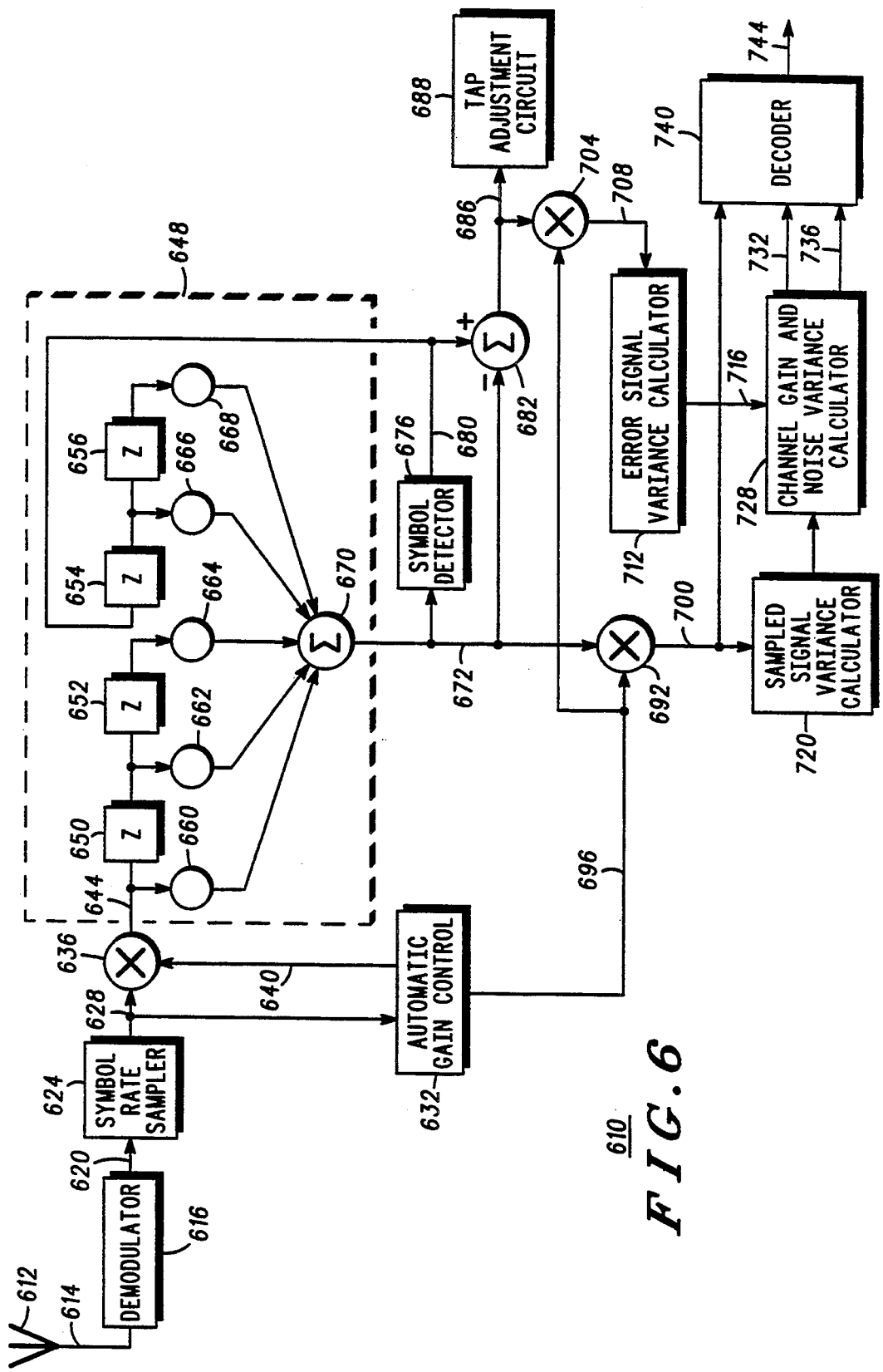
FIG. 6 is a block diagram of a decision feedback equalizer (DFE) of a preferred embodiment of the present invention.

Turning now to the block diagram of FIG. 6, receiver 610 of an alternate preferred embodiment of the present invention is shown. Receiver 610, similar to receiver 410 of FIG. 5 includes equalizer circuitry for removing intersymbol interference generated during transmission of a modulated signal upon a multi-path channel. Additionally, because receiver 610 includes circuitry similar to that of the circuitry of system 130 of FIG. 2, interference caused by Rayleigh fading is removed to decode more accurately the received signal.

Receiver 610 comprises antenna 612 which receives a signal transmitted thereto upon a communication channel. Antenna 612 generates a signal on line 614 which is coupled to demodulator 616. Demodulator 616 generates a demodulated signal on line 620 which is supplied to symbol rate sampler 624. Symbol rate sampler 624 samples the signal supplied thereto and generates a sampled signal on line 628.

The signal generated on line 628 is supplied to automatic gain control (AGC) circuit 632 and to an input of mixer 436. AGC circuit 632 generates a signal on line 640 which is supplied to a second input of mixer 636. Mixer 636 is operative to remove the gain of the signal generated on line 428 when the signal generated by AGC circuit 632 is the inverse of the gain of the signal. Mixer 636 generates a mixed signal on line 644 which forms an input to an equalizer, indicated in the Figure by block 648, shown in hatch. Equalizer 648 of FIG. 6 is formed of a five-tap filter having delay elements 650, 652, 654, and 656. Tap coefficients 660, 662, 664, 666, and 668 weight the values of the sampled signals supplied to equalizer 648 and 644 or at the output of various ones of the delay elements 650–656. As illustrated, equalizer 648 forms a decision feedback equalizer (DFE).

The weighted values generated by tap coefficients 660–668 are supplied to summing element 670 which generates a summed signal on line 672. Line 672 is coupled to symbol detector 676 which quantizes the signal supplied thereto and generates a quantized signal indicative thereof on line 680. Line 680 is coupled to an input of summing element 682 as is the filtered (i.e., equalized) signal generated on line 672. Summing element 682 forms a difference signal representative of the difference between the quantized signals generated on line 680 and the filtered (i.e., equalized) signal generated on line 672. The difference signal formed by summing element 682 is generated on line 686 which is supplied to tap adjustment circuit 688. Tap adjustment circuit 688 generates signals to adjust coefficient values of tap coefficients 660–668.

The filtered (i.e., equalized) signal generated on line 672 is supplied to an input of mixer 692. Mixer 692 is further supplied with a gain control signal generated by AGC circuit 632 on line 696. Mixer 692 generates a mixed signal on line 700.

The signal generated on line 686 is additionally supplied as a first input to mixer circuit 704. The gain control signal generated by AGC circuit 632 on line 696 is supplied as a second input to mixer circuit 704.

Mixer circuit 704 generates a mixed signal on line 708 which is supplied to error signal variance calculator 712. Calculator 712 calculates the variance of the signal supplied thereto on line 708, and generates a signal indicative of such variance on line 716.

The signal generated by mixer 692 on line 700 is supplied to sampled signal variance calculator 720. Sampled signal variance calculator 720 calculates the variance of the signal supplied thereto, and generates a signal indicative of such variance on line 724.

Lines 716 and 724 are coupled to channel gain and noise variance calculator 728. Calculator 728 is operative, in manners similar to calculators 378 of FIG. 4 and 178 of FIG. 2, to calculate values of the channel gain and noise variance of a communication channel upon which a signal is transmitted to receiver 610.

Signals indicative of the values of channel gain and noise variance calculated by calculator 728 are generated on lines 732 and 736, respectively, which are coupled to decoder 740. Line 700 is also coupled to the decoder.

Decoder 740 is operative to generate a decoded signal on line 744. Because decoder 740 receives signals on lines 732 and 736 indicative of the channel gain and noise variance, respectively, calculated by calculator 728, the decoded signal generated by decoder 740 on line 744 contains fewer errors than that capable of existing receivers. Additionally, because receiver 610 includes equalizer 648, receiver 610 is operative better to correct for intersymbol interference of a signal transmitted upon a multi-path channel.

Figure 7:
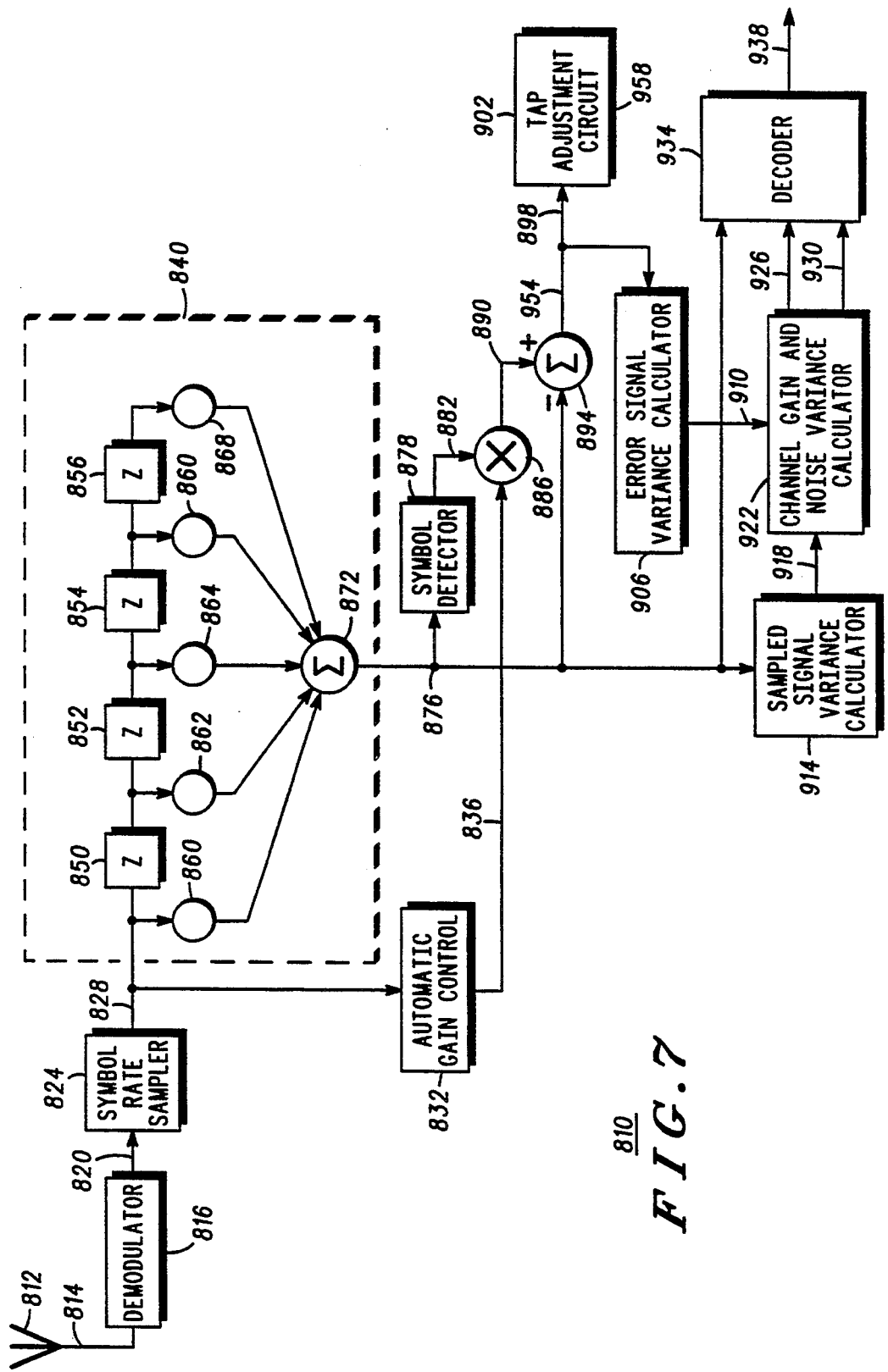
FIG. 7 is a block diagram of a linear transversal equalizer (LTE) of an alternate preferred embodiment of the present invention.

Turning now to the block diagram of FIG. 7, receiver 810 of another alternate preferred embodiment of the present invention is illustrated. Similar to the receivers of FIGS. 5–6, receiver 810 of FIG. 7 is operative to reduce receiver error responsive to interference caused by intersymbol interference and Rayleigh fading. Receiver 810 includes equalizer circuitry for reducing receiver error caused by intersymbol interference, and circuitry similar to that of FIG. 2, for reducing receiver error caused by Rayleigh fading.

Receiver 810 comprises antenna 812 for receiving a signal transmitted upon a communication channel thereto. Antenna 812 generates a signal on line 814 which is coupled to demodulator 816. Demodulator 816 generates a demodulated signal on line 820 which is supplied to the symbol rate sampler 824. Symbol rate sampler 824 generates sampled signals on line 828 indicative of sampled portions of the signal supplied to sampler 824 on line 820.

Line 828 is coupled to automatic gain control (AGC) circuit 832. AGC circuit 832 generates a gain control signal on line 836. Line 828 additionally forms an input to an equalizer, indicated in the Figure by block 840, shown in hatch. Equalizer 840 is, similar to equalizer 448 of FIG. 5 formed of a linear transversal equalizer (LTE), and comprises a five-tap, adaptive filter. As illustrated, equalizer 840 is formed of delay elements 850, 852, 854, and 856, and tap coefficients 860, 862, 864, 866, and 868. Tap coefficients 860–868 weight the values of the signal on line 828 and the delayed signals generated by delay elements 850–856, respectively. The weighted signals generated by tap coefficients 860–868 are supplied as inputs to summing element 872.

Summing element 872 sums the signals supplied thereto, and generates a filtered (i.e., equalized) signal on line 876. Line 876 is coupled to sample detector 878 which quantizes the signal supplied thereto, and generates a quantized signal indicative thereof on line 882. Line 882 is coupled, as an input, to mixer element 886. The gain control signal generated by AGC circuit 832 on line 836 is supplied, as a second input, to mixer element 886.

Mixer element 886 generates a mixed signal on line 890 which is supplied to a positive input to summing element 894. The signal generated on line 876 is supplied to an inverting input to summing element 894. Element 894 forms the difference of the two signals supplied thereto, and generates a difference signal, i.e., an error signal, on line 898. Line 898 is coupled to tap adjustment circuit 902 which adjusts the coefficient values of tap coefficients 860–868.

The difference signal generated on line 898 is also supplied to error signal variance calculator 906. Calculator 906 calculates the variance of the signal supplied thereto, and generates a signal indicative of such calculated variance on line 910.

The signal generated on line 876 is coupled to sampled signal variance calculator 914. Calculator 914 calculates the variance of the signal supplied thereto, and generates a signal indicative of such calculated variance on line 918.

Lines 910 and 918 are coupled to channel gain and noise variance calculator 922. Calculator 922 calculates values of channel gain and noise variance of a communication channel upon which a signal is transmitted to receiver 810.

Signals indicative of the values of channel gain and noise variance calculated by calculator 922 are generated on lines 926 and 930, respectively, which are coupled to decoder 934. Line 876 is also coupled to the decoder. Because decoder 934 receives signals on lines 926 and 930 indicative of the channel gain and noise variance, respectively, calculated by calculator 922, the decoded signal generated by decoder 934 on line 938 contains fewer errors than that capable of existing receivers. This configuration advantageously avoids imposing a gain on the signal generated thereby. Imposition of an unknown, time-varying gain would otherwise detrimentally affect the decoding process.

Figure 8:
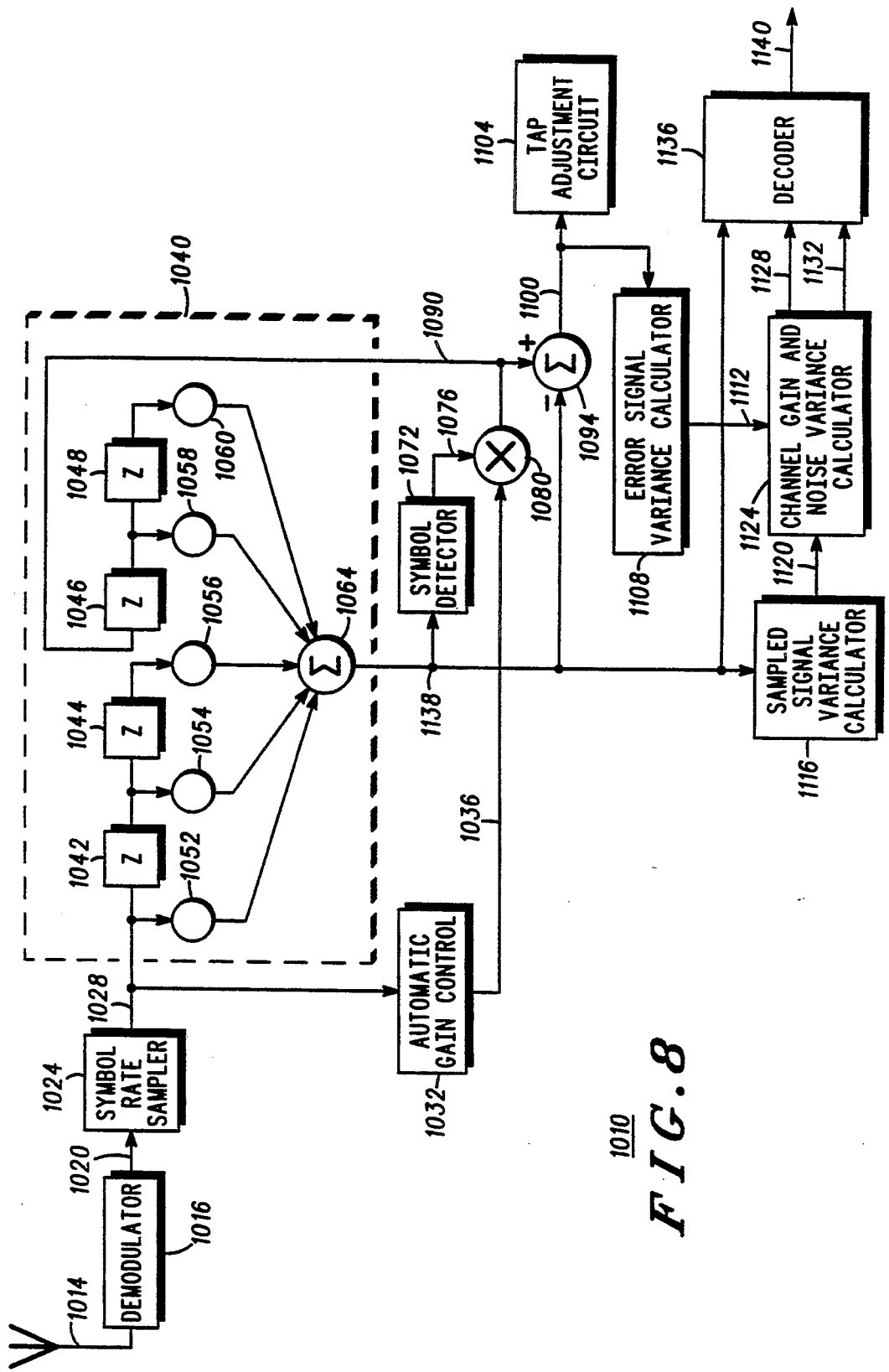
FIG. 8 is a block diagram of a decision feedback equalizer (DFE) of an alternate preferred embodiment of the present invention.

Turning now to the block diagram of FIG. 8, there is shown yet another alternate preferred embodiment of a receiver, referred to generally by reference numeral 1010 of the present invention. Receiver 1010, similar to the receivers of the preceding figures, corrects for the effects of intersymbol interference and Rayleigh fading.

Receiver 1010 comprises antenna 1012 which receives a communication signal transmitted thereto over a communication channel. Antenna 1012 generates a signal on line 1014 which is supplied to demodulator 1016. Demodulator 1016 generates a demodulated signal on line 1020 which is supplied to symbol rate sampler 1024. Symbol rate sampler 1024 samples the signal supplied thereto and generates a sampled signal indicative thereof on line 1028.

Line 1028 is coupled to automatic gain control (AGC) circuit 1032. AGC circuit 1032 generates a gain control signal on line 1036. Line 1028 additionally forms an input to an equalizer, indicated in the Figure by block 1040, shown in hatch. Equalizer 1040, similar to equalizer 648 of FIG. 6 forms a decision feedback equalizer (DFE) for generating a filtered (i.e., equalized) signal responsive to application of an input signal thereto. Equalizer 1040 is here formed of a five-tap filter.

Equalizers of other members of taps are, of course similarly possible. Equalizer 1040 is comprised of delay elements 1042, 1044, 1046, and 1048 and tap coefficients 1052, 1054, 1056, 1058, and 1060. Tap coefficients weight the values of signal applied thereto and generate weighted signals which are applied, as inputs, to summing element 1064. Summing element 1064 generates a summed signal on line 1068 which forms a filtered (i.e., equalized) signal. Line 068 is coupled to sample detector 1072 which is operative to quantize the values of the signals supplied thereto. Sample detector 1072 generates a signal indicative of such quantized values on line 1076 which is coupled to an input of mixer 1080. The gain control signal generated by AGC circuit 1032 on line 1036 is additionally coupled to mixer 1080.

Mixer 1080 mixes the signals supplied thereto and generates a mixed signal on line 1090. Line 1090 is coupled as an input to summing element 1094. The signal on line 1068 forms a second input to summing element 1094. Summing element 1094 is operative to form the difference between the mixed, quantized signal supplied thereto and the filtered signal supplied thereto, and to form a difference signal on line 1100 indicative thereof which is supplied to tap adjustment circuit 1104. Tap adjustment circuit 1104 is operative to alter values of the coefficient values of tap coefficients 1052-1060.

The difference signal generated on line 110 is also supplied to error signal variance calculator 1108. Calculator 1108 calculates the variance of the signal supplied thereto, and generates a signal indicative of such calculated variance on line 1112.

The signal generated on line 1068 is coupled to sampled signal variance calculator 1116. Calculator 1116 calculates the variance of the signal supplied thereto, and generates a signal indicative of such calculated variance on line 1120.

Lines 1112 and 1120 are coupled to channel gain and noise variance calculator 1124. Calculator 1124 calculates values of channel gain and noise variance of a communication channel upon which a signal is transmitted to receiver 1010.

Signals indicative of the values of channel gain and noise variance calculated by calculator 1124 are generated on lines 1128 and 1132, respectively, which are coupled to decoder 1136. Line 1068 is also coupled to the decoder.

Decoder 1136 is operative to decode the signal applied thereto on line 1068 and to generate a decoded signal on line 1140. Because decoder 1136 receives signals on lines 1128 and 1132 indicative of the channel gain and noise variance calculated by calculator 1124, the decoded signal generated by decoder 1136 on line 1140 contains fewer errors than that capable of existing receivers. This configuration advantageously avoids imposing a gain on the signal generated thereby. Imposition of an unknown, time-varying gain would otherwise detrimentally affect the decoding process.

Turning now to FIG. 9, a block diagram of circuitry, referred to generally by reference numeral 1200, utilized as a portion of a coherent receiver which receives a differentially-encoded signal transmitted thereto is shown. A coherent detector (when combined with the structure of FIG. 9) permits linear treatment of a differentially-encoded received signal.

A sampled, received signal is supplied on line 1204, in sequence, to: delay element 1216, magnitude setting block 1220, phase quantizing block 1224, and complex conjugate converter block 1228. Magnitude setting block 1220 and phase quantizing block 1224 may together comprise a symbol detector, indicated in the Figure by block 1226, shown in hatch. The signal generated by block 1228 is supplied, as an input, to mixer 1238. Line 1204 is additionally coupled to form an input to mixer 1238. Mixer 1238 generates a mixed signal on line 1242. Circuit 1200 may advantageously form a portion of a receiver circuit, such as any of the receiver circuits shown in any of the previous figures when a differentially-encoded signal is to be received thereat.

FIG. 10 is a block diagram of a circuit, here referred to generally by reference numeral 1250, similar to that of FIG. 9, also illustrating a portion of a receiver which receives a differentially-encoded signal. The receiver may be either a coherent or noncoherent receiver. The circuit of FIG. 10 also permits a nearly linear treatment of a differentially-encoded, received signal.

A sampled, received signal is supplied on line 1254 to delay element 1266 which generates a delayed signal on line 1268 which is supplied to complex conjugate converter 1270. Converter 1270 generates a signal on line 1272 which is supplied, as an input, to mixer 1274. Line 1254 is additionally coupled to a second input to mixer 1274. Mixer 1274 generates a mixed signal on line 1276. Circuit 1250 may advantageously form a portion of a receiver circuit, such as any of the receiver circuits shown in any of the previous figures when a differentially-encoded signal is to be received thereat.

The signal, Z(k), generated by mixer 1274 on line 1276 may be described mathematically by the equation:

$$Z(k) = r(k)r(k-1)^*$$

where:

$$r(k) = p_o(k)e^{j\omega(k)} + n(k)$$

and where:
$p_o(k)$ is the channel gain;
$\omega(k)$ is the transmitted phase angle at time k;
$n(k)$ is a noise value; and
* indicates a complex conjugate.

Here, $\omega(k)$, the transmitted phase at time k is an element of the set $\{\pi/4, 3\pi/4, 5\pi/4, 7\pi/4\}$ for a QPSK modulated signal.

By expansion and multiplication of terms, the following equation may be obtained:

$$Z(k) = (p_o(k)e^{j\omega(k)} + n(k))(p_o(k-1)e^{j\omega(k-1)} + n(k-1))^*$$

and, then:

$$Z(k) = p_o(k)p^*_o(k-1)e^{j(\omega(k)-w(k-1))} + p^*_o(k-1)e^{-j\omega(k-1)}n(k) + p_o(k)e^{j\omega(k)}n^*(k-1) + n(k)n^*(k-1)$$

The first term of the above equation is a faded, differentially-detected symbol; no phase error is present in this term. Complex error is, however, present in the subsequent three terms. As the final term is small relative to the middle two terms (the "error terms"), the final term may be ignored. When channel gain is not rapidly changing, $p_o(k)$ is approximately equal to $p_o(k-1)$, and, hence, $p_o(k) = p_o(k-1)$. The channel gain is also a real term. Therefore, the above equation may be simplified as follows:

$$Z(k) = p_o^2 e^{j(\omega k) - w(k-1))} + p_o e^{-j\omega(k-1)}n(k) + p_o e^{j\omega(k)}n^*(k-1)$$

By factoring of the $P_o$ term, the following equation may be obtained:

$$Z(k) = p_o(p_o e^{j\omega(k) - w(k-1)} + e^{-j\omega(k-1)}n(k) + e^{j\omega(k)}n^*(k-1)).$$

When the noise factors, i.e., n(k) terms, are Gaussian, the phase terms multiplying the noise factors may be ignored, and the two noise factors may be combined into another Gaussian random variable, defined by N. The equation may be further simplified to form the equation:

$$Z(k) = p_o((p_o e^{j(\omega(k) - w(k-1))}) + 2N)$$

Again, Z(k) represents the signal generated on line 1276 by mixer 1274. The signal Z(k) generated by mixer 1274 on line 1276, and represented in simplified form hereinabove may be separated into two factors, a first of which being the channel gain $P_o$, and a second of which being the factor $((p_o e^{j(\omega(k) - w(k-1))}) + 2N)$. When N is small, this second factor is approximately equal to r(k), and, therefore, by substitution, Z(k) may be represented as $Z(k) = p_o r(k)$ A metric formula for a trellis of a Viterbi algorithm, such as a Viterbi algorithm forming a portion of a channel decoder of a receiver is governed by the following equation:

$$\lambda' = [Cp_o(k)/\sigma^2_n(k)]r(k) \times (k)$$

where:
C is an arbitrary constant;
$\sigma^2_n(k)$ is a value of noise variance;
r(k) is a sampled, received signal; and
x(k) is a sampled, transmitted signal.

When $\sigma^2_n(k)$ is a constant value, $\sigma^2_n(k)$ can be written together as part of arbitrary constant C to form a new constant, namely $K = C/\sigma^2_n(k)$, and $\lambda'$, the metric of the Viterbi algorithm, may be written as:

$$\lambda' = Z(k) \times (k)$$

Therefore, circuit 1250 may be utilized to approximate the optimal decoding metric.

Turning now to the block diagram of FIG. 11, a diversity receiver, referred to generally by reference numeral 1380 which includes the circuit of FIG. 10 as a portion thereof is shown. Operation of a diversity receiver is described in greater detail with respect to FIG. 4. Similar to the embodiment of FIG. 4, diversity receiver 1380 of FIG. 11 is comprised of two branches.

A first branch of diversity receiver 1380 is comprised of antenna 1384 for detecting a modulated signal transmitted upon a communication channel thereto. Antenna 1384 supplies a received signal on line 1386 to demodulator 1390. Demodulator 1390 generates a demodulated signal indicative of the signal received by antenna 1384 on line 1394. Line 1394 is coupled to first branch symbol rate sampler 1398 which samples the signal supplied thereto and generates a sampled signal on line 1400. Line 1400 is coupled to an input of first branch mixer 1404 which also receives a gain coefficient, indicated by $g_1$, on line 1406. First branch mixer 1404 generates a mixed signal on line 1408.

Diversity receiver 1380 additionally is comprised of a second branch formed of antenna 1414 which is spaced-apart from antenna 1384. Antenna 1414 is operative to receive a modulated signal transmitted thereto on a communication channel. Antenna 1414 supplies a received signal on line 1416 to demodulator 1420. Demodulator 1420 generates a demodulated signal on line 1424 which is supplied to second branch symbol rate sampler 1428. Symbol rate sampler 1428 is operative in a manner similar to symbol rate sampler 1398 of the first branch of the receiver 1380 to sample the signal supplied thereto on line 1424 and to generate a sampled signal on line 1430. Line 1430 is coupled to an input of second branch mixer 1434. A gain coefficient, indicated by $g_2$, is also supplied to a second input of mixer 1434 on line 1436. Second branch mixer 1434 generates an output signal on line 1438.

Lines 1408 and 1438 are coupled to form inputs to summing element 1440. Summing element 1440 generates a summed signal on line 1442. The combined, sampled signal generated on line 1442 by summing element 1440 is supplied to circuit 1450. Circuit 1450 corresponds to circuit 1250 of FIG. 11. Circuit 1450 generates a signal on line 1460 which is supplied to decoder 1470. As shown mathematically hereinabove, circuit 1450 may be utilized to approximate the optimal decoding metric.

Decoder 1470 is operative to decode the signal supplied thereto on line 1460.

Turning now to the block diagram of FIG. 12, another diversity receiver, referred to generally by reference numeral 1480 which includes the circuit of FIG. 9 as a portion thereof is shown. Operation of a diversity receiver is described in greater detail with respect to FIG. 4. Similar to the embodiment of FIG. 4, diversity receiver 1480 of FIG. 12 is comprised of two branches.

A first branch of diversity receiver 1480 is comprised of antenna 1484 for detecting a modulated signal transmitted upon a communication channel thereto. Antenna 1484 supplies a received signal on line 1486 to demodulator 1490. Demodulator 1490 generates a demodulated signal indicative of the signal received by antenna 1484 on line 1494. Line 1494 is coupled to first branch symbol rate sampler 1498 which samples the signal supplied thereto and generates a sampled signal on line 1500. Line 1500 is coupled to an input of first branch mixer 1504 which also receives a gain coefficient, indicated by $g_1$, on line 1506. First branch mixer 1504 generates a mixed signal on line 1508.

Diversity receiver 1480 additionally is comprised of a second branch formed of antenna 1514 which is spaced-apart from antenna 1584. Antenna 1514 is operative to receive a modulated signal transmitted thereto on a communication channel. Antenna 1514 supplies a received signal on line 1516 to demodulator 1520. Demodulator 1520 generates a demodulated signal on line 1524 which is supplied to second branch symbol rate sampler 1528. Symbol rate sampler 1528 is operative in a manner similar to symbol rate sampler 1498 of the first branch of the receiver 1480 to sample the signal supplied thereto on line 1524 and to generate a sampled signal on line 1530. Line 1530 is coupled to an input of second branch mixer 1534. A gain coefficient, indicated by $g_2$, is also supplied to a second input of mixer 1534 on line 1536. Second branch mixer 1534 generates an output signal on line 1538.

Lines 1508 and 1538 are coupled to form inputs to summing element 1540. Summing element 1540 generates a summed signal on line 1542. The combined, sampled signal generated on line 1542 by summing element 1540 is supplied to circuit 1550, sampled signal variance calculator 1553, and symbol detector 1555. Circuit 1550 corresponds to circuit 1200 of FIG. 9. Circuit 1550 generates a signal on line 1556. Calculator 1553 is operative to calculate the variance of the signal supplied thereto on line 1542. The signal indicative of the variance calculated by calculator 1553 is generated on line 1557.

Symbol detector 1555 is operative to quantize the signal supplied thereto on line 1542. Symbol detector 1555, in a preferred embodiment of the present invention, quantizes the summed signal supplied thereto into one of the four allowable signal level values permitted of a QPSK signal. The quantized signal generated by symbol detector 1555, denoted by $r_c(k)$, is generated on line 1558 and supplied to summing element 1562. Summing element 1562 is additionally coupled to receive the signal generated on line 1542. Summing element 1562 determines the difference, referred to as error signal $e(k)$, between the quantized signal supplied thereto on line 1542 and the signal supplied thereto on line 1552 and generates a signal indicative of such difference on line 1566. Line 1566 is coupled to error signal variance calculator 1570.

Error signal variance calculator 1570 is operative to calculate the variance of the error signal supplied thereto on line 1566. Calculator 1570 generates a signal indicative of such calculated variance on line 1574.

Lines 1557 and 1574 are coupled to channel gain and noise variance calculator 1578. Calculator 1578 is operative to calculate the channel gain and noise variance of the communication channel upon which a signal $x(t)$ is transmitted to antennas 1484 and 1514. Calculator 1578 generates signals on lines 1582 and 1586 indicative of calculated values of channel gain and noise variance, respectively.

Lines 1582 and 1586 are coupled to decoder 1588. Decoder 1588 is also supplied with the signal generated by circuit 1550 on line 1556. Decoder 1588 is operative to decode the signal supplied thereto on line 1552. Because decoder 1586 receives signals on lines 1582 and 1586 indicative of the channel gain and the noise variance of the communication channel, decoder 1588 generates a decoded signal on line 1592 of improved accuracy.

Comparison of receiver 1480 of FIG. 12 with receiver 1380 of FIG. 11 indicates that, when the noise level is low, and the noise variance may be considered constant, the receiver of FIG. 11 may be utilized to permit circuit simplification.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A receiver for receiving and decoding a differentially-encoded, communication signal transmitted thereto over a communication channel, said receiver comprising:

means for demodulating the differentially-encoded, communication signal transmitted over the communication channel to form a demodulated, received signal thereby;

means for sampling values of at least portions of the demodulated, received signal and for generating a sampled signal indicative thereof;

means forming a decoding metric estimator coupled to receive the sampled signal wherein the decoding metric estimator includes a delay element coupled to receive the sampled signal generated by said means for sampling and operative to generate a delayed signal, a complex conjugate converter coupled to receive a signal representative of the delayed signal and operative to generate a complex conjugate signal, and a mixer coupled to receive the sampled signal and the complex conjugate signal and operative to mix the sampled signal and the complex conjugate signal theretogether to form thereby a mixed signal which comprises a metric estimation signal; and means forming a soft decision decoder for receiving the metric estimation signal generated by the decoding metric estimator, and for decoding the metric estimation signal when received thereat.

2. The receiver of claim 1 wherein the decoding metric estimator formed by said means for generating the metric estimation signal further comprises a symbol detector coupled to receive the delayed signal generated by the delay element and operative to generate a detected symbol signal and wherein the detected symbol signal comprises the signal representative of the delayed signal received by the complex conjugate converter.

3. The receiver of claim 2 wherein the symbol detector is comprised of a magnitude setter coupled in-line with a phase quantizer wherein the magnitude setter is coupled to receive the delayed signal.

4. A receiver for receiving and decoding a differentially-encoded, communication signal transmitted thereto over a communication channel, said receiver comprising:

means for demodulating the differentially-encoded, communication signal transmitted over the communication channel to form a demodulated, received signal thereby;

means for sampling values of at least portions of the demodulated, received signal and for generating a sampled signal indicative thereof;

means forming a decoding metric estimator coupled to receive the sampled signal for generating a metric estimation signal wherein the decoding metric estimator formed thereby comprises a delay element coupled to receive the sampled signal generated by said means for sampling and operative to generate a delayed signal, a symbol detector coupled to receive the delayed signal and operative to generate a detected-symbol signal, a complex conjugate converter coupled to receive the detected-symbol signal and operative to generate a complex conjugate signal, and a mixer coupled to receive the sampled signal and the complex conjugate signal and operative to mix the sampled signal and the complex conjugate signal theretogether to form thereby a mixed signal comprising the metric estimation signal; and means forming a soft decision decoder for receiving the metric estimation signal generated by the decoding metric estimator, and for decoding the metric estimation signal when received thereat.

* * * * *